US006925850B2

United States Patent
Comer et al.

(10) Patent No.: US 6,925,850 B2
(45) Date of Patent: Aug. 9, 2005

(54) METHOD AND DEVICE FOR CALIBRATING ROTARY AXIS

(75) Inventors: Paul Comer, Mason, OH (US); David Purtell, Cincinnati, OH (US); Satish Shivaswamy, Mason, OH (US)

(73) Assignee: Magus GmbH (CH)

( * ) Notice: Subject to any disclaimer, the term of this patent is extended or adjusted under 35 U.S.C. 154(b) by 0 days.

(21) Appl. No.: 10/296,368

(22) PCT Filed: May 29, 2001

(86) PCT No.: PCT/US01/17297

§ 371 (c)(1),
(2), (4) Date: Nov. 3, 2003

(87) PCT Pub. No.: WO01/92825

PCT Pub. Date: Dec. 6, 2001

(65) Prior Publication Data

US 2004/0050139 A1 Mar. 18, 2004

Related U.S. Application Data

(60) Provisional application No. 60/208,152, filed on May 31, 2000.

(51) Int. Cl.[7] .............................................. G01B 19/42
(52) U.S. Cl. ...................................................... 73/1.75
(58) Field of Search ............................. 73/1.75; 33/534, 33/1 N, 569

(56) References Cited

U.S. PATENT DOCUMENTS 5,239,855 A * 8/1993 Schleifer et al. ............. 73/1.75

* cited by examiner

*Primary Examiner*—Robert Raevis
(74) *Attorney, Agent, or Firm*—Reising, Ethington, Barnes, Kisselle, P.C.

(57) ABSTRACT

A present invention is for a device and method for measuring and calibrating the rotary motion of a rotatable machine member, such as a pivotable swivel member (2b) of a spindle (2) of a five-axis machine tool (1). The device includes an arm (110) mounted to the spindle, a housing (120) mounted to the arm, an optical encoder mounted internal to the arm and positioned therein to measure rotation about an axis extending lengthwise along the housing, which such axis is parallel to the axis about which the swivel member rotates. The device also includes a rotary table (170) mounted to the housing opposite the arm, the rotary table comprising a stator (171) fixedly mounted to the housing and a rotor (172) clampedly affixed to a shaft passing through the housing. The shaft is coupled to an input shaft of the encoder such that rotary movement of the rotor can be measured by the encoder. An electronic level (190) fixedly secured to the rotor, such as by a bracket (180). The encoder, the rotary table and the level are each electronically coupled to a control system which is adapted to obtain readings from the encoder and from the level and to command controlled rotation of the rotor relative to the stator.

18 Claims, 11 Drawing Sheets

METHOD AND DEVICE FOR CALIBRATING ROTARY AXIS

This application claims the benefit of Provisional Application No. 60/208,152, filed May 31, 2000.

BACKGROUND OF THE INVENTION

The present invention relates to methods and devices for measuring and calibrating angular positioning of a machine member about a rotary axis. More particularly, the present invention relates to methods and devices for measuring and calibrating angular positioning of a machine member about a rotary axis, wherein a compensation value is empirically derived for each of one or more commanded rotary positions, and wherein the compensation value is based upon an actual rotary position accurately measured for a given commanded rotary position.

With reference to FIG. 1, a conventional machine tool 1, for example, a horizontal machining center, typically includes a spindle 2 mounted in a spindle carrier 3 for high-speed rotation about an axis parallel to a spindle axis "Z". The spindle carrier 3 is typically translatable in directions $\omega_X$, $\omega_Y$ parallel to perpendicular axes "X", "Y", respectively, to which spindle axis "Z" is likewise perpendicular. The spindle 3 includes a free end adapted to securely grip a tool 4 for unitary rotation therewith. The machine tool 1 typically includes a worktable 5 moveable in a direction parallel to the spindle axis "Z" and rotatable in a direction about an axis "B" parallel to axis "Y". The worktable 5 is adapted to securely receive a pallet 6 thereon for unitary movement towards and away from the spindle in direction $\omega_Z$, as well as for unitary rotation therewith in direction $\omega_B$. A workpiece 7 affixed to the pallet 6, then, may be positioned opposite the tool 4 by movement of the worktable 5 in direction $\omega_Z$ and may thereby present its surfaces to the tool 4 by rotation of the worktable 5 in direction $\omega_B$.

Movement of the spindle carrier 3 in directions $\omega_X$, $\omega_Y$, as well as movement of the worktable 5 in direction $\omega_Z$ and rotation of the worktable 5 in direction $\omega_B$, is controlled, for example, by a conventional computer numerical control (CNC) program, in a manner such that the workpiece 7 may be machined by the tool 4. Because the tool 4 and the workpiece 7 are moveable relative to one another along four axes of motion, namely, in directions $\omega_X$, $\omega_Y$, $\omega_Z$ along linear axes "X", "Y", "Z", respectively, and in direction ωB about rotary axis "B", such a machine tool 1 is said to be a "four axis machine tool".

However, it is oftentimes desirable for the machine tool 1 to be provided with an additional axis of motion, that is, a so-called "five axis machine". For example, referring to FIG. 2, the spindle 2 may comprise a base member 2a and a swivel member 2b which are pivotable relative to one another in a direction $\omega_A$ about a swivel axis "A", the swivel axis "A" typically being horizontal, and therefore, parallel to axis "X" and perpendicular to axis "Z". Tool 4, then, may approach the workpiece 7 at many angles oblique thereto, thereby increasing the complexity of the machining operations which may be performed by the machine tool 1.

As with nearly all machining operations, however, positioning of the tool 4 relative to the workpiece 7 must be performed with a high degree of accuracy and repeatability. Presently, this is accomplished, in part, through the use of conventional CNC programs, which, along with conventional servomechanisms, linear motors and ballscrew-type drives, provide accurate and repeatable machine member motion. For example, a conventional CNC program may command a servomotor (not shown) coupled to the swivel member 2b to rotate the swivel member 2b in the direction $\omega_A$ through an angular displacement of 30°. The CNC-controlled servomotor provides accurate and repeatable motion, relative to the initial and final positions of the swivel member 2b, typically accurate to within 3–10 arc-seconds.

According to one known method for calibrating the movement of a machine member about a rotary axis, a conventional bubble level is suspended from the machine member for rotation therewith about an axis parallel to the axis about which calibration is desired. A precision angular measuring device, such as an optical encoder, is connected to the level such that rotation of the level relative to the machine member can be measured. With the machine member in a first position, the level is manually positioned in an "on-level" orientation and the angular measuring device is "zeroed". The machine member is then moved to a second position and the level is thereafter manually re-positioned to the "on-level" orientation, if necessary. The rotary displacement of the level is measured and compared to the desired rotation of the machine member to obtain an error compensation value. However, because this method requires manual positioning of the level, any error compensation values obtained thereby may include unavoidably inaccuracies. It is therefor desirable to provide a method for calibrating movement of a machine member about a rotary axis, wherein rotation of a calibration device used therefor is controlled.

It is desirable to provide a device and method for calibrating the rotary movement and positioning of a rotatable machine member.

It is furthermore desirable to provide a device and a method for acquiring rotary position data of a rotatable machine member and for empirically deriving compensation values to correct rotary positioning errors.

It is even furthermore desirable to provide a device and method for automatedly acquiring rotary position data of a rotatable machine member for each position of a plurality of positions defining a range of motion of the machine member.

It is also desirable to provide a device and method for acquiring rotary position data of a rotatable machine member oriented for rotation about a horizontal, vertical or oblique axis.

It is furthermore desirable to provide a device and method for generating an NC program to directly control movement and positioning of a machine member.

SUMMARY OF INVENTION

The present invention is for a device and a method for measuring and calibrating the rotary motion of a rotatable machine member, such as a pivotable swivel member of a spindle of a five-axis machine tool. The device includes an arm mounted to the spindle, a housing mounted to the arm, an optical encoder mounted internal to the arm and positioned therein to measure rotation about an axis extending lengthwise along the housing, which such axis is parallel to the axis about which the swivel member rotates. The device also includes a rotary table mounted to the housing opposite the arm, the rotary table comprising a stator fixedly mounted to the housing and a rotor clampedly affixed to a shaft passing through the housing. The shaft is coupled to an input shaft of the encoder such that rotary movement of the rotor can be measured by the encoder. An electronic level is fixedly secured to the rotor, such as by a bracket. The encoder, the rotary table and the level are each electronically coupled to a control system which is adapted to obtain readings from the encoder and from the level and to command controlled rotation of the rotor relative to the stator.

Generally stated, the method according to the present invention for using the device hereof to calibrate rotary movement and positioning of the spindle about a horizontally-oriented axis of rotation includes the steps of positioning the spindle in a reference position, whereat the level is in an "on-level" orientation, commanding the spindle to move to a preselected angular position, commanding the rotary table to move the level in a direction opposite to the direction of movement of the spindle until the level measures substantially "on-level" orientation, measuring with the incoder the actual movement of the level and comparing the actual movement of the level with the commanded movement of the spindle to the obtain an offset value. The method is repeated for various preselected angular positions, thereby generating an offset position value for each of a plurality of angular positions of the spindle within a predefined range of angular positions of the spindle. The offset values may be stored in a compensation table which is used by the control system of the machine to adjust the position of the spindle, at each angular position commanded, thereby correcting any positioning errors, i.e., the difference between the location where the spindle was commanded to move and the location where the spindle actually moved. A calibration program is provided to automatedly perform the method of the present invention for each commanded position of a plurality of commanded positions defining the range of motion of the spindle.

According to one aspect hereof, the present invention provides a device and method for calibrating the rotary movement and positioning of a rotatable machine member.

According to another aspect hereof, the present invention provides a device and a method for acquiring rotary position data of a rotatable machine member and for empirically deriving compensation values to correct rotary positioning errors.

According to yet another aspect hereof, the present invention provides a device and method for automatedly acquiring rotary position data of a rotatable machine member for each position of a plurality of positions defining a range of motion of the machine member.

According to still another aspect hereof, the present invention provides a device and method for acquiring rotary position data of a rotatable machine member oriented for rotation about a horizontal, vertical or oblique axis.

According to yet another aspect hereof, the present invention provides a device and method for generating an NC program to directly control movement and positioning of a machine member.

A method for calibrating movement of a machine member about a rotary axis according to the present invention includes the steps of mounting a calibration device to the member for rotation relative thereto; detecting a reference orientation of the calibration device when the member is in a first position, the calibration device forming a first position angle relative to the member when the member is in the first position and the calibration device is in the reference orientation; selecting a commanded position of the member; detecting a difference between the commanded position and the first position to obtain a reference angle; moving the member towards the commanded position until the member reaches a second position; moving the calibration device until the calibration device is near the reference orientation, the calibration device forming a second position angle relative to the member when the member is in the second position and the calibration device is near the reference orientation, detecting a difference between the first and second position angles to obtain a displacement angle; and, comparing the reference angle to the displacement angle to obtain an offset angle; characterized in that movement of the calibration device is in response to the orientation thereof.

A device for measuring movement of a machine member about a rotary axis according to the present invention comprises: a rotary drive having a first portion connected to the member and a second portion controllably rotatable relative to the first portion, an orientation detection device connected to the second portion of the rotary drive for detecting the orientation of the device; and, an angle measurement device connected to the member and coupled to the orientation measurement device; characterized in that the second portion of the rotary drive is adapted to move in response to feedback from the orientation detection device.

BRIEF DESCRIPTION OF THE DRAWINGS

A better understanding of the present invention will be had upon reference to the following description in conjunction with the accompanying drawings in which like numerals refer to like parts, and wherein:

FIG. 1A is a detail schematic side view of the four axis machine tool of FIG. 1, showing the spindle approaching the workpiece;

FIG. 2A is a detail schematic side view of the five axis machine tool of FIG. 2, showing the spindle approaching the workpiece;

DETAILED DESCRIPTION OF THE PREFERRED EMBODIMENTS

Figure 3:
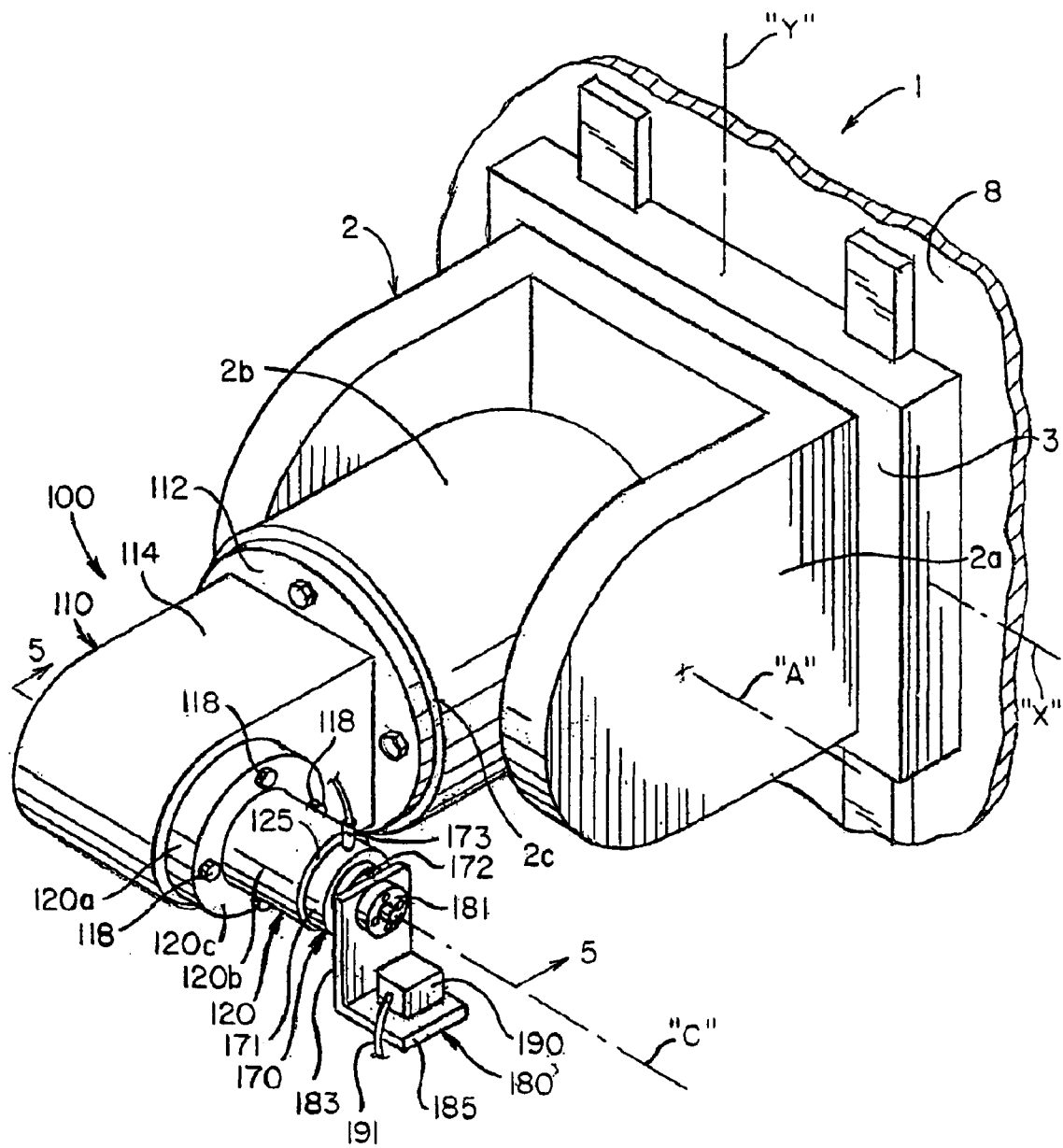
FIG. 3 is a schematic perspective view of a rotary axis calibration device according to one embodiment of the present invention, shown mounted to a spindle of the five axis machine tool of FIG. 2.

With reference to FIG. 3, a rotary calibration device 100 according to one embodiment of the present invention is removably affixable to a machine member, for example, a swivel member 2b of a spindle 2 of a five axis machine tool 1. Although the device 100 will be described herein with reference to a swivel member 2b of a spindle 2 of a five-axis machine tool 1, it will be apparent to those of ordinary skill in the art, upon reading the within detailed description, that the present invention may be affixed to any rotatable machine member for calibration of the rotary motion thereof. For example, machines such as composite tape-laying or fiber-placement machines, which typically provide multiple axes of rotary movement, may utilize the device and method hereof to calibrate motion of each such axis.

Figure 4:
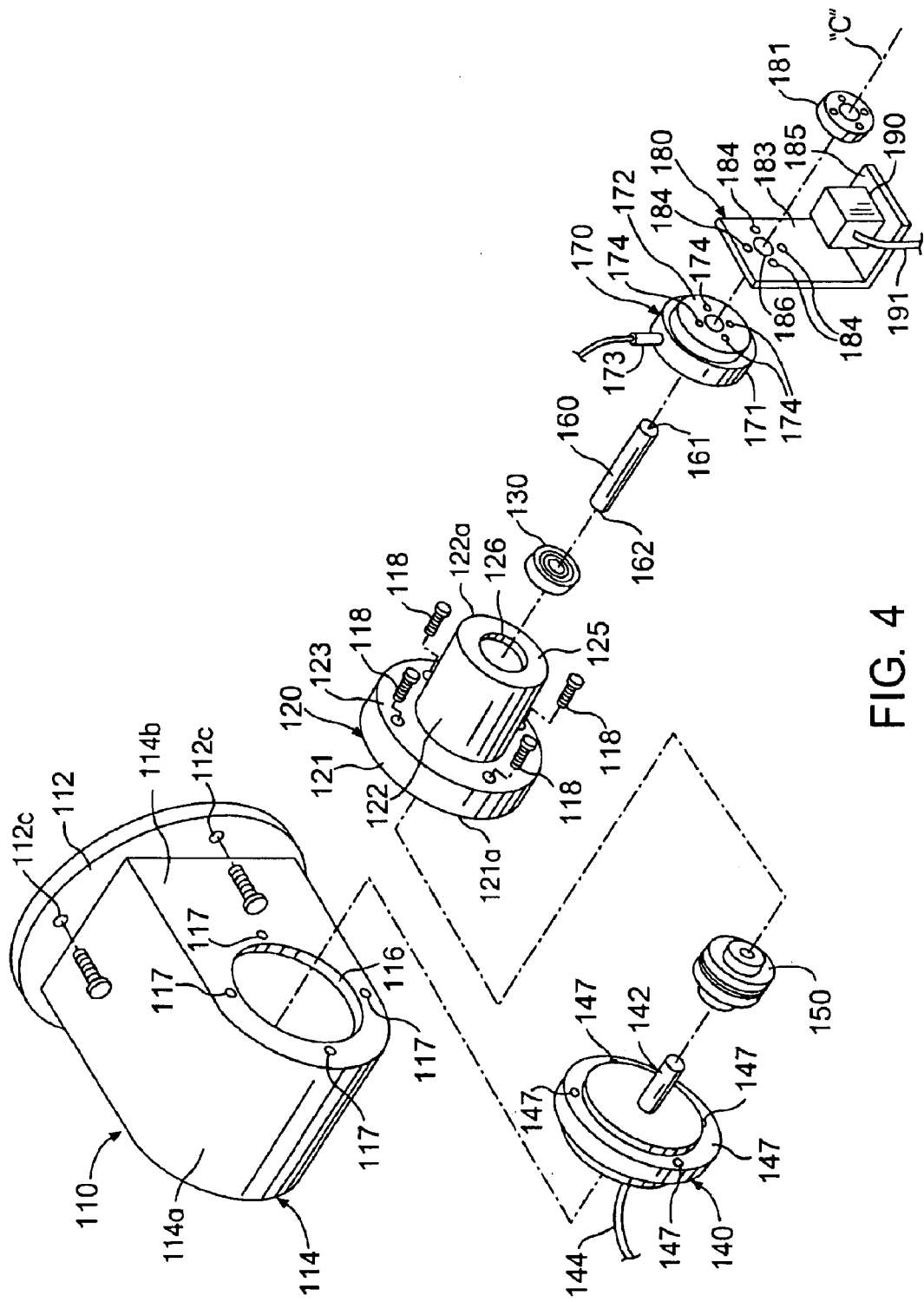
FIG. 4 is an exploded perspective view of the rotary axis calibration device of FIG. 3.
Figure 5:
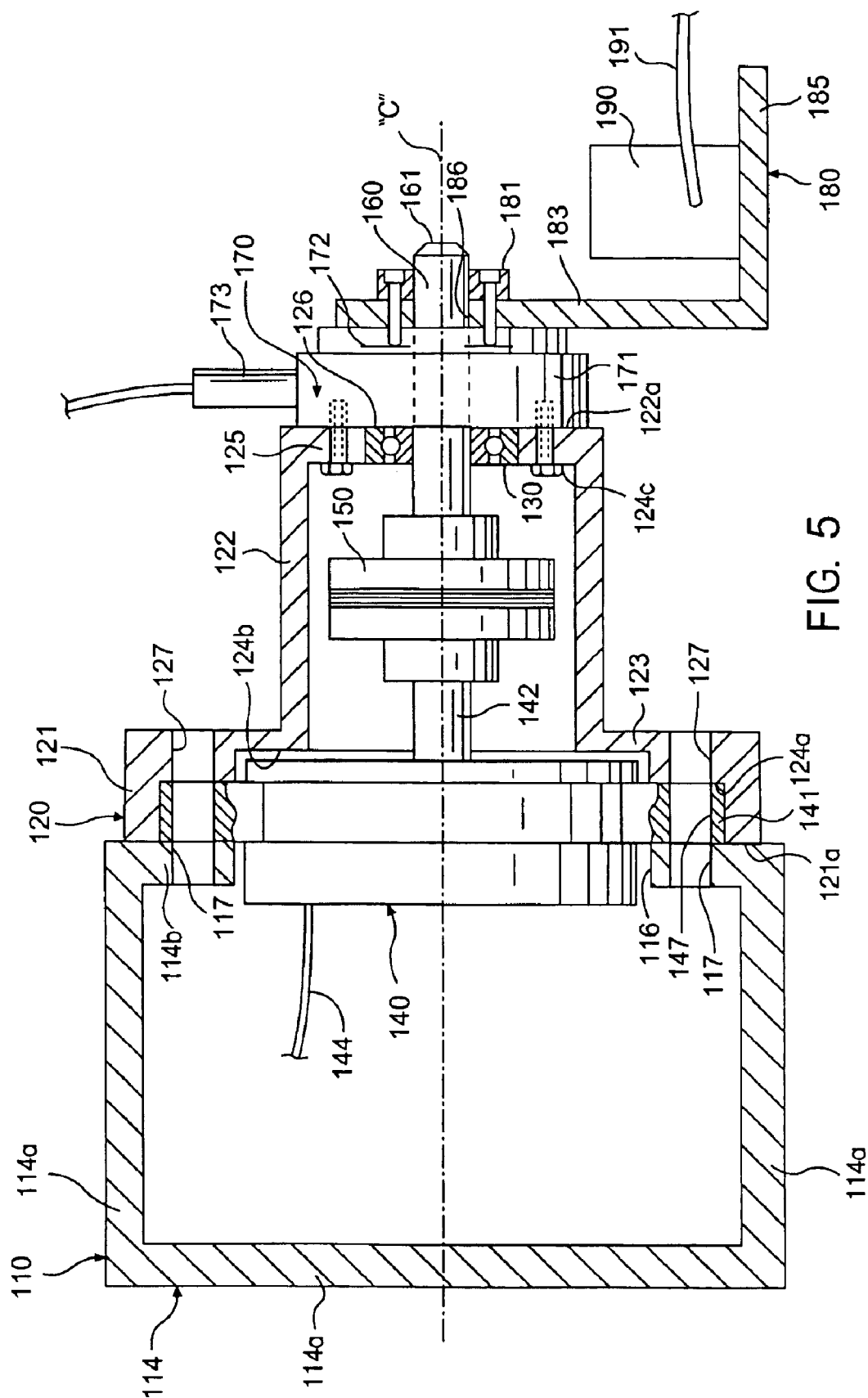
FIG. 5 is a partial sectional view of the rotary axis calibration device of FIG. 3, shown along section line 5—5 of FIG. 3.

More particularly, and with additional reference now to FIGS. 4 and 5, the device 100 includes a rigid arm 110 having a base plate 112 and a fixture 114 secured to the base plate 112, for example, by welding. The fixture 114 is preferably a welded construction having walls 114a, 114b projecting from the base plate 112 to form a substantially box-shaped construction, wherein the base plate 12 is affixed to one end thereof. The base plate 112 is adapted to be secured to a face 2c of the swivel member 2b. For example, base plate 112 may include one or more holes 112c for bolting the arm 110 to the face 2c of the swivel member 2b.

One side wall 114b of the fixture 114 includes an opening 116 surrounded by one or more holes 117 positioned outwardly from the opening 116 and spaced equidistantly therearound. Each hole 117 is sized to receive one conventional bolt 118 therethrough and may be threaded to engage the threaded portion of the bolt 118. Alternatively, holes 117 may be throughbores, in which case, a nut (not shown), or the like, is provided to engage the threaded portions of the bolts 118 from within the fixture 114.

A substantially cylindrical housing 120 is provided to cover the opening 116 of the fixture 114. The housing 120 includes a first sleeve portion 121 and a second sleeve portion 122 connected to the first sleeve portion 121 by an annular shoulder 123. One or more holes 127 are provided through the shoulder 123 positioned outwardly from the second sleeve portion 122 and spaced equidistantly therearound to each align with one of the holes 117 provided in the side wall 114b of the fixture 114. Preferably, holes 127 are throughbores, each of which is sized to receive one bolt 118 therethrough. Housing 120 is securely, albeit removably, affixed to the fixture 114, then, by aligning fixture holes 117 with housing holes 127 and engaging the bolts 118, for example, with threads provided in holes 117, or as stated above, alternatively, with nuts (not shown) provided internal to the fixture 114. Opening 116, first sleeve portion 121 and second sleeve portion 122 are preferably coaxially aligned along a "C" which is parallel to swivel axis "A", and therefore, horizontally oriented.

Although the present embodiment shows the arm 110 adapted to be mounted to the face 2c of the swivel member 2b, arm 110 may take any form adapted to orient central axis "C" parallel to the axis, for example, swivel axis "A", about which calibration of the rotary movement thereof is desired. Moreover, although fixture 114 is shown having a box-shaped construction mounted to base plate 112, any configuration thereof, such as an angle bracket, which orients central axis "C" parallel to the axis to be calibrated, may be substituted therefor.

The housing 120 includes a central passageway extending therethrough along axis "C" and having a first inwardly-projecting annular step 124a spaced a first distance from a proximate end 121a of the first sleeve portion 121, a second inwardly-projecting annular step 124b spaced a second distance from the proximate end 121a of the first sleeve portion 121 and a third inwardly-projecting annular step 124c spaced a third distance from the proximate end 121a of the first sleeve portion. The second step 124b preferably forms (and is integral with) an interior annular surface of the annular shoulder 123 and the third step 124c preferably forms (and is integral with) an interior annular surface of an end cap 125 formed in a distal end 122a of the second sleeve portion 122. Accordingly, annular shoulder 123 is preferably located approximately the first distance from the proximate end 121a of the first sleeve portion 121 and the end cap 125 is preferably located approximately the third distance from the proximate end 121a of the first sleeve portion 121. End cap 125 includes a bearing opening 126 sized to receive a conventional radial bearing 130 press-fit thereinto such that the axis of rotation of the bearing 130 is oriented substantially along central axis "C".

A conventional angle measurement device, such as an optical encoder 140, such as a model ROD 800, sold by Heidenhain Corporation of Schaumberg, Ill. is fitted within the housing 120, and more particularly, within the first sleeve portion 121 of the housing 120. The encoder 140 is typically of a stepped disc-shaped construction and includes an annular flange 141 projecting radially therefrom for mounting of the encoder 140. The flange 141 includes one or more holes 147 spaced equidistantly therearound and positioned thereon to align with holes 127 of the housing 120, and with holes 117 of the fixture 110 when the housing 120 is positioned over the opening 116 of the fixture 110. It will be appreciated by one skilled in the art that the number and location of holes 117, 127 will depend on the number and location of holes 147 provided in the encoder 140. Holes 147 are preferably throughbores, each of which is sized to receive one bolt 118 therethrough Encoder 140, then, is securely, albeit removably, affixed to the fixture 114 by aligning encoder holes 147 between fixture holes 117 and housing holes 127 and engaging the bolts 118, for example, with threads provided in holes 117, or as stated above, alternatively, with nuts (not shown) provided internal to the fixture 114. The encoder flange 141 is sandwiched between the first step 124a of the central passageway of the first sleeve portion 121 of the housing 120 and the side wall 114b of the fixture 110 and held securely therebetween. It will be appreciated by one skilled in the art that configuration of housing 120 may be adapted, such as by including or excluding steps 124a, 124b, 124c as shown in the Figures, according to the size, shape and construction of the encoder 140.

The encoder 140 includes an input shaft 142 projecting therefrom which is coupled to instrumentation (not shown) housed within the encoder 140 for measuring rotary motion of the input shaft 142. When the encoder 140 is positioned within the housing 120 of the device 100 according to the present invention, the input shaft 142 of the encoder 140 is positioned entirely within the passageway and reaches towards the end cap 125 of the housing 120. The encoder 140 is electronically coupled to a control 500 (FIG. 10), for example, by interface cable 144, which transmits rotary measurement data obtained by the internal instrumentation (not shown) of the encoder 140 to the control 500.

A shaft 160 is positioned partially within the housing 120 and extending outwardly therefrom through the opening 126, or more particularly, through the radial bearing 130 mounted within the opening 126, such that a first end 161 of the shaft is positioned outside of the housing 120. The radial bearing 130 supports a middle portion of the shaft 160 for rotation of the shaft 160 within the opening 126 substantially around central axis "C". A second end 162 of the shaft 160 is positioned within the housing 160 and is coupled to the input shaft 142 of the encoder 140, for example, by a conventional disc coupling 150, for unitary rotation therewith. Rotary motion of the shaft 160, then, can be measured directly by the encoder 140. Because a disc coupling 150 couples shaft 160 to input shaft 142, slight radial movement of the shaft 160 will not be communicated to input shaft 142. Additional bearings (not shown) may be provided to support the shaft 160 at one or more locations along the central axis "C".

A conventional rotary drive, such as a rotary servo table 170, for example, a model 20000 RT Series, sold by Parker Daedal Corporation, Daedal Division, of Irwin, Pa., is mounted to an outside face of the end cap 125, such as, for example, by bolts (not shown), and includes a central passageway through which shaft 160 extends such that the first end 161 of the shaft 160 is positioned outside of the rotary table 170. Preferably, rotary table 170 includes a first portion, such as a stator 171, mounted to the end cap 125 and a second portion, such as a rotor 172, rotatably coupled to the stator 171 in any conventional fashion to permit a positive rotary drive relationship therebetween That is, rotor 172 is adapted to rotate, relative to stator 171, in a predefined direction and through a predefined arcuate sweep, in response to motion commands supplied to the rotary table 170 through interface with the control 500 (FIG. 10), such as by interface cable 173.

A mounting bracket 180 is affixed to the rotor 172, for example, by a clamp 181 with one or more bolts passing through throughbores 183 of the bracket 180 and threadingly engaging threaded holes 174 provided in the rotor 172. The bracket 180 is preferably an "L"-shaped welded construction having an upright member 183 and a shelf member 185. The throughbores 184 are provided near an upper end of the upright member 183, surrounding an opening 186 for slidingly receiving the shaft 160 therethrough, such that the bracket 180 depends vertically downwardly from the housing 120. Shelf member 185, then, is offset from the central axis "C" by a fixed distance.

The clamp 181 is a radial-type clamp, whereby securing the clamp 181 to the upright member 183 of the bracket 180 applies a radial clamping force to the shaft 160 to directly couple the clamp 181 and the shaft 160 for unitary rotation therebetween. Because the clamp 181 is fixedly secured (by bolts) to the bracket 180, and because the bracket 180 is likewise fixedly secured to the rotor 172 by the bolts, rotation of the rotor 172, for example, in response to commands from control 500 (FIG. 10), causes unitary rotation of the shaft 160, and of the encoder input shaft 142. Rotary motion of the rotor 172 is directly measured, then, by the encoder 140 and communicated to the control 500 (FIG. 10), such as by interface cable 144.

An orientation measurement device, such as an electronic level 190, for example, a digital inclination measuring device, sold by Wyler A G of Winterthur, Switzerland under the trademark ZEROTRONIC is fixedly mounted to the bracket 180, such as to the shelf member 185. The level 190 is electronically coupled to the control 500 (FIG. 10), for example, by interface cable 191, to communicate, at least, an "on-level" or "off-level" orientation. Preferably, the level 190 is adapted and equiped to communicate to the control 500 an angular measurement of the magnitude from the "on-level" orientation. It will be obvious to one or ordinary skill in the art, upon reading the within detailed description, that the arrangement of the components of the device 100 may be modified without departing from either the spirit or the scope of the present invention. For example, in the present embodiment hereof, the rotary table 170 is shown positioned between the encoder 140 and the level 190. However, the relative positioning of the rotary table 170, the encoder 140 and the level 190 may be modified without departing from the spirit or the scope of the present invention. Moreover, the level 190 is shown coupled to the rotor 172 by bracket 180. However, the level 190 may alternatively be mounted directly to the rotor 172 in any conventional fashion, such as where the level 190 includes a housing adapted for mounting.

Figure 6:
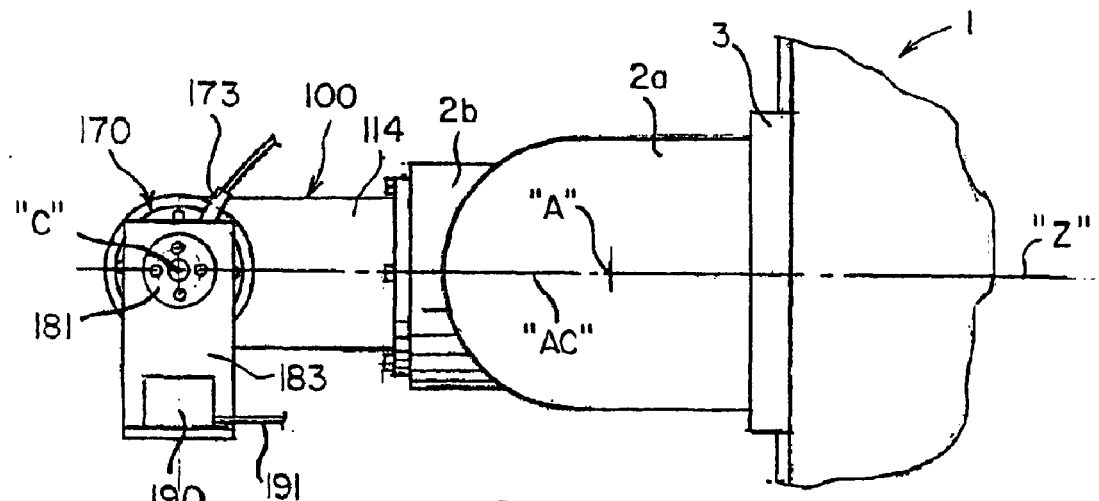
FIG. 6 is a side view of the rotary axis calibration device of FIG. 3, shown mounted to the spindle of the five axis machine of FIG. 3, wherein a swivel member of the spindle is shown in a reference position, and wherein a bracket of the rotary axis calibration device is shown in a reference position.
Figure 7:
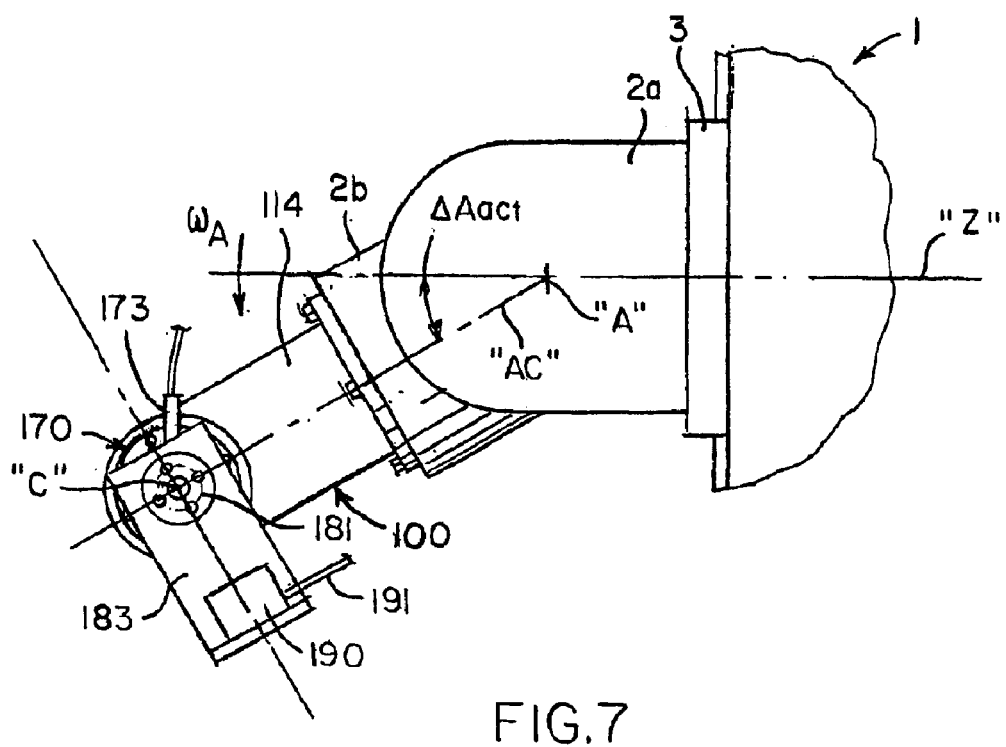
FIG. 7 is a side view of the rotary axis calibration device of FIG. 3, shown mounted to the spindle of the five axis machine of FIG. 3, wherein a swivel member of the spindle is shown in a commanded position, and wherein the bracket of the rotary axis calibration device is shown in the reference position.
Figure 8:
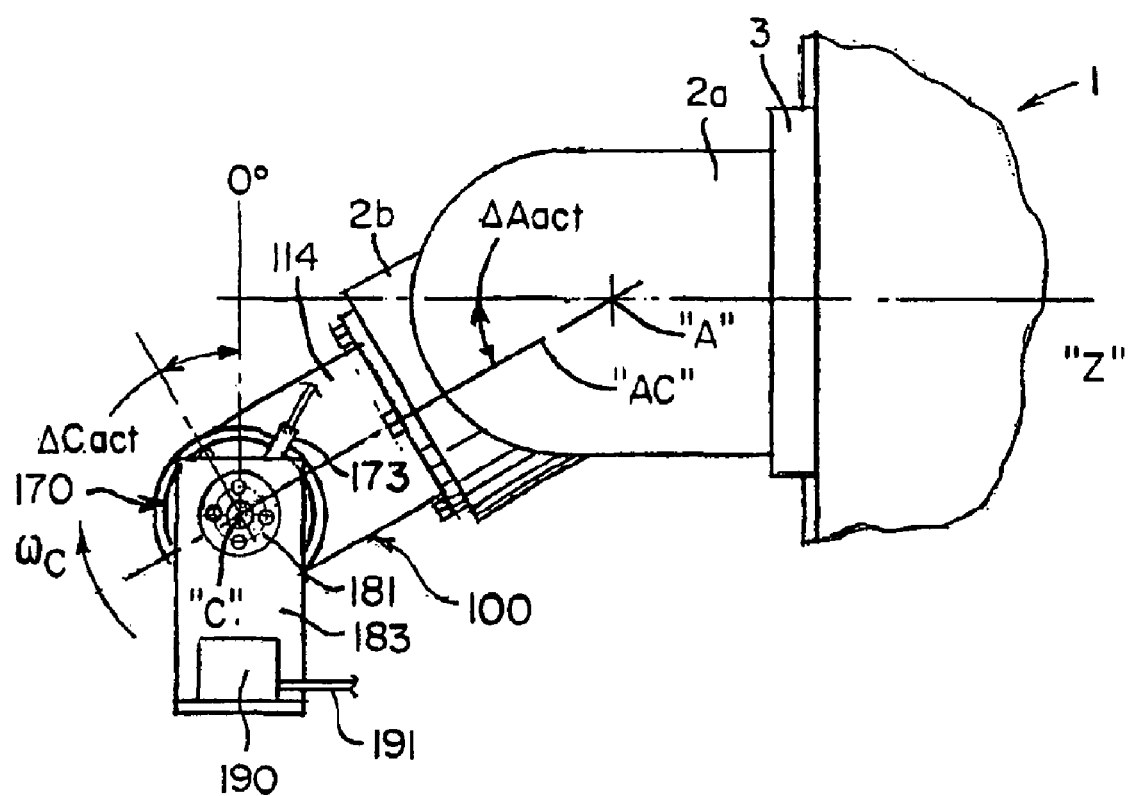
FIG. 8 is a side view of the rotary axis calibration device of FIG. 3, shown mounted to the spindle of the five axis machine of FIG. 3, wherein a swivel member of the spindle is shown in a command position, and wherein the bracket of the rotary axis calibration device is shown in a level position.

With reference now to FIGS. 6–8, use of the rotary calibration device 100 according to the present invention to calibrate rotary motion and positioning of a machine member, such as the swivel member 2b, will be described With reference first to FIG. 6, the swivel member 2b is commanded to move to a reference position (otherwise referred-to herein as a "first position"), whereat the central axis "C" of the device 100 is aligned with the swivel axis "A" of the spindle 2 along axis "Z", which, as stated above, is horizontally oriented. For the purpose of this description, swivel axis "A" is the rotary axis for which calibration of the rotary movement of the swivel member 2b thereabout is desired. As is shown in the Figures, axes "A", "C" are connected by line segment "AC" which is perpendicular to both axes "A", "C" and which extends lengthwise along the swivel member 2b. When the swivel member 2b is in the reference position, shown in FIG. 6, line segment "AC" lies along axis "Z".

To position the device 100 into a reference position (otherwise referred-to herein as a "reference orientation"), the rotary table 170 (FIG. 5) rotates the bracket 180 (and the electronic level 190, which is mounted to the bracket 180) into a substantially vertical orientation, whereat the electronic level 190 reads approximately a "zeroed", or "on-level", orientation. The electronic level 190 is then electronically "zeroed" in this reference position to read precisely an "on-lever" orientation of 0°. The device 100 is now ready to obtain readings to calibrate rotary motion of the swivel member 2b about axis "A". Although the preferred method hereof will be described with reference to a starting reference position whereat line segment "AC" lies along axis "Z", line segment "AC" may be oriented alternatively to form any angle relative to axis "Z". This is because the present invention relies on movement of the device relative to its reference position, regardless of what orientation the device may occupy when in that reference position, as will be understood more clearly upon reading the following description. In any event, calibration device 100 forms a first position angle relative to the line segment "AC" when the swivel member 2b is in the reference position and the device 100 is in the reference orientation.

Referring now to FIG. 7, the swivel member 2b is commanded to move in the direction $\omega_A$ about axis "A" through an angle $\Delta A_{com}$, for example, 30° downward from the reference position. Although the swivel member 2b is commanded to move $\Delta A_{com}$, the actual rotary movement $\Delta A_{act}$ (otherwise referred-to herein as a displacement angle) of the swivel member 2b is likely not $\Delta A_{com}$, precisely, but rather is offset, albeit repeatably, therefrom by some measurable offset angle $\Delta A_{off}$, owing to the inherent inaccuracy of the metrology system, the drives or the servo system, for example, due to slack in the drive transmission. Swivel member 2b moves through $\Delta A_{act}$ to reach a second position. Accordingly, control 500 FIG. 10) does not detect swivel member 2b to have moved through $\Delta A_{com}$, but rather, detects swivel member 2b to have moved through $\Delta A_{act}$. Thus, a positioning error arises between the position where the control 500 (FIG. 10) detects the swivel member 2b to be and the position where the swivel member 2b actually is. This error is quantified as $\Delta A_{off}$. It follows, then, that $\Delta A_{com} = \Delta A_{act} + \Delta A_{off}$.

Owing to the design of the rotary table 170, unless commanded to move, rotor 172 and stator 171 do not move relative to one another, and as such, the rotor 172 does not rotate relative to the stator 171 about axis "C" as the spindle member 2b is rotated about axis "A". The bracket 180, then, which is mounted directly to the rotor 172, does not rotate about axis "C" as the swivel member 2b moves in direction $\omega_A$, but rather remains perpendicular to line "AC". When swivel member 2b has moved through $\Delta A_{act}$ (which, as stated above, control 500 (FIG. 10) detects to be $\Delta A_{com}$), bracket 180 becomes angularly oriented, relative to it's vertically-oriented, "on-level" reference position (FIG. 6) by an angle of $\Delta C_{act}$. Any positioning error offset $\Delta A_{off}$ due to the difference between the commanded and the actual positions $\Delta A_{com}$, $\Delta A_{act}$, respectively, of the swivel member 2b results in a positioning error offset $\Delta C_{off}$ in the orientation of the bracket 180. The offset $\Delta C_{off}$ of the bracket orientation, then, is a measure of the difference in the angular orientation of the bracket 180, about axis "C" and relative to the reference position (FIG. 6) of the bracket 180, between the angular orientation $\Delta C_{com}$ of the bracket 180 if the swivel member 2b were moved precisely $\Delta A_{com}$ and the actual angular orientation $\Delta C_{act}$ of the bracket 180 as a result of the swivel member 2b actually moving through $\Delta A_{act}$. Of course, assuring rigid members, $\Delta C_{com} = \Delta A_{com}$, $\Delta C_{act} = \Delta A_{act}$ and $\Delta C_{off} = \Delta A_{off}$. Measuring $\Delta C_{act}$, then, provides an accurate measurement of $\Delta A_{act}$, which, if compared to the commanded motion $\Delta A_{com}$, will accurately measure the offset $\Delta A_{off}$ of the swivel member 2b. The empirically-derived value for the offset $\Delta A_{off}$, then, can be used to correct any rotary positioning error of the swivel member 180.

Referring now to FIG. 8, the rotary table 170 is commanded to move in a second direction $\omega_C$ about axis "C", which such direction $\omega_C$ is opposite to direction $\omega_A$. Using position feedback control from electronic level interface cable 191, control 500 (FIG. 10) commands rotary table 170 to move rotor 172 thereof (and the bracket 180, which is affixed to the rotor 172) in direction $\omega_C$ or in a direction opposite to direction $\omega_A$ until the electronic level 190 reads substantially a "zero" or "on-level" orientation which, as stated above, is near the reference orientation of the device 100. As can be seen by FIG. 8, device 100 now forms a second position angle relative to the line segment "AC" when the device 100 is near the reference orientation and when the swivel member 2b is in the second position.

Although the rotary table 170 is adapted to achieve very high degrees of accuracy, it is unlikely that rotary table 170 and electronic level 190 can successfully negotiate rotation of the bracket 180 such that the electronic level 190, as positioned by the rotary table 170, is precisely in the "zero" or "on-level" position. However, the electronic level 190 need not read precisely a "zero" or "on-level" orientation in order for the device 100 to accurately calibrate rotary motion of the swivel member 2b about swivel axis "A". Accordingly, control 500 (FIG. 10) will command rotary table 170 to rotate the bracket 180 until the electronic level 180 measures some reference angular distance $\Delta C_{ref}$ within a predefined window, for example, ±2 arc-seconds, from the "zero" or "on-level" position. The window is defined by lower and upper limits. Once the reference angular orientation $\Delta C_{ref}$ of the electronic level 190 is within the window (i.e., between the lower and upper limits), control 500 (FIG. 10) reads the reference measurement $\Delta C_{ref}$ and records this measurement for subsequent use as described in greater detail below.

As the rotary table 170 rotates the bracket 180 from the inclined position shown in FIG. 7 to the final position shown in FIG. 8, the optical encoder 140 accurately measures the angular displacement $\Delta C_{enc}$ of the bracket 180 between these positions. Because the level 190 was "zeroed" prior to movement of the swivel member 2b (FIG. 6), when the value $\Delta C_{enc}$ measured by the encoder 140 is added to the reference measurement $\Delta C_{ref}$ of the bracket 180, the resulting sum corresponds to the actual angular displacement of the bracket 180 due to the rotation of the swivel member 2b, that angular distance being quantified as angle $\Delta C_{act}$. As stated above, $\Delta C_{act} = \Delta C_{ref} + \Delta C_{enc} = \Delta A_{act}$. Therefore, comparing $\Delta A_{act}$ to $\Delta A_{com}$ results in an empirical value for $\Delta A_{off}$, for the preselected value of $\Delta A_{com}$. The value for $\Delta A_{off}$ may be transmitted using conventional techniques to the machine tool control to command the swivel member 2b to move a distance in this offset amount. The final position of the swivel member 2b, then, will be precisely the commanded position $\Delta A_{com}$.

Repeating the above procedure for various given values of $\Delta A_{com}$ and recording the value of $\Delta A_{off}$ calculated for each value of $\Delta A_{com}$ provides a look-up table, oftentimes referred to as a "comp table" or "compensation table", whereby an offset value of $\Delta A_{off}$ can be determined for many preselected values of $\Delta A_{com}$. Transmitting data from the compensation table to the machine tool control, then, generates a numerical control ("NC") program, which may be adapted to provide precise motion control of the swivel member 2b for all positions within its range of motion. Because motion of the swivel member 2b, motion of the rotary table 170 and acquisition of all measurements are controlled entirely by control 500 (FIG. 10), the procedure for calibrating rotary motion of the swivel member 2b throughout its entire range of motion, can be automated, thereby reducing manual operator setup and participation.

The data obtained from the calibration procedure described herein has many uses. For example, repeatability calculations can be made by commanding the swivel member 2b to move to one preselected rotary position a plurality of times, and the empirically-derived values of the offset $\Delta A_{off}$ and the actual position $\Delta A_{act}$ can be statistically analyzed to determine how frequently the swivel member 2b moves to the same position. The data can be compiled and organized in either numerical tables or graphical print-outs to assist the operator in analyzing the rotary motion of the machine member.

Figure 9:
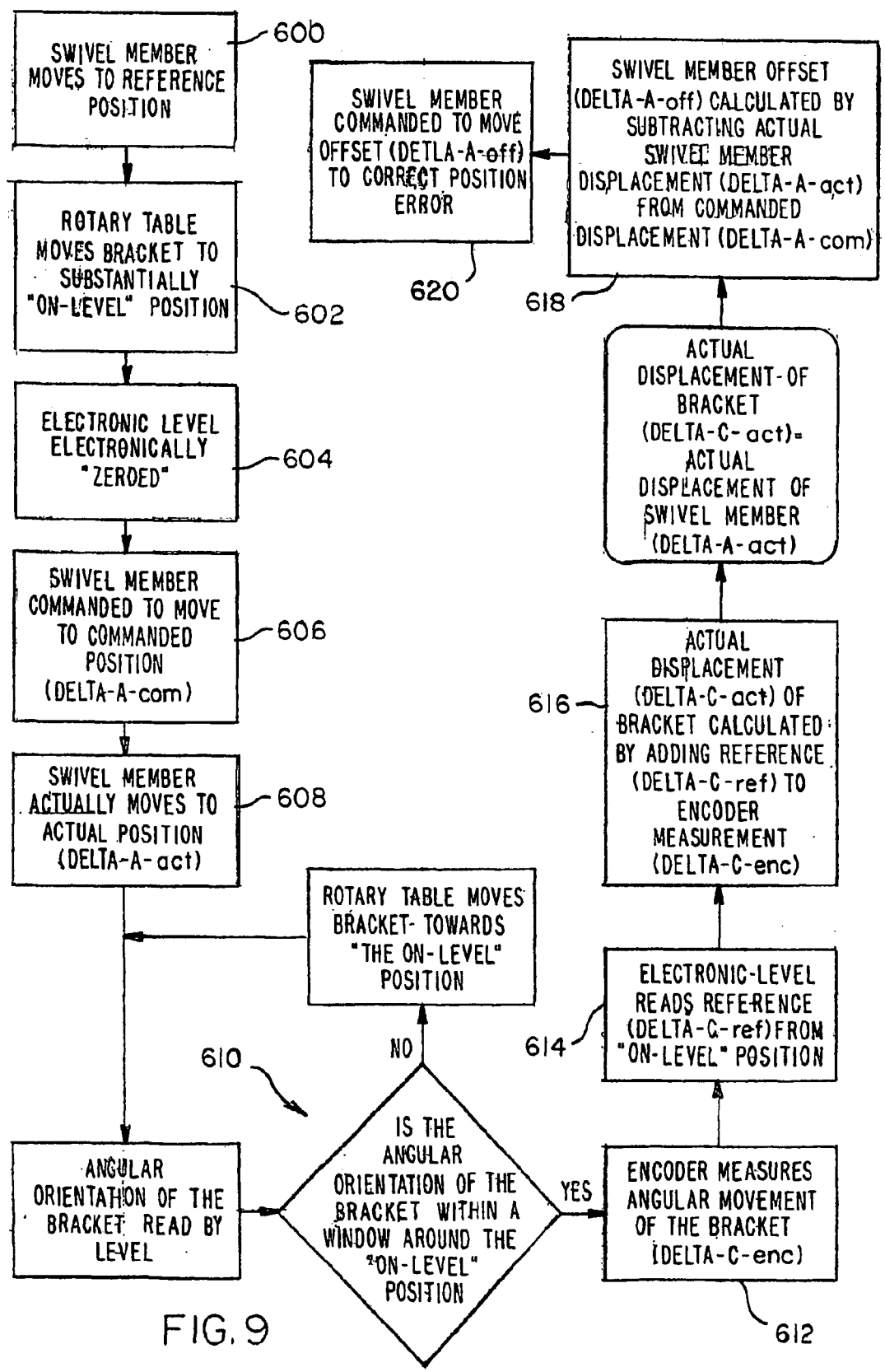
FIG. 9 is a flow chart of a method for using the rotary axis calibration device of FIG. 3 to calibrate the rotary positioning of a machine member.
Figure 10:
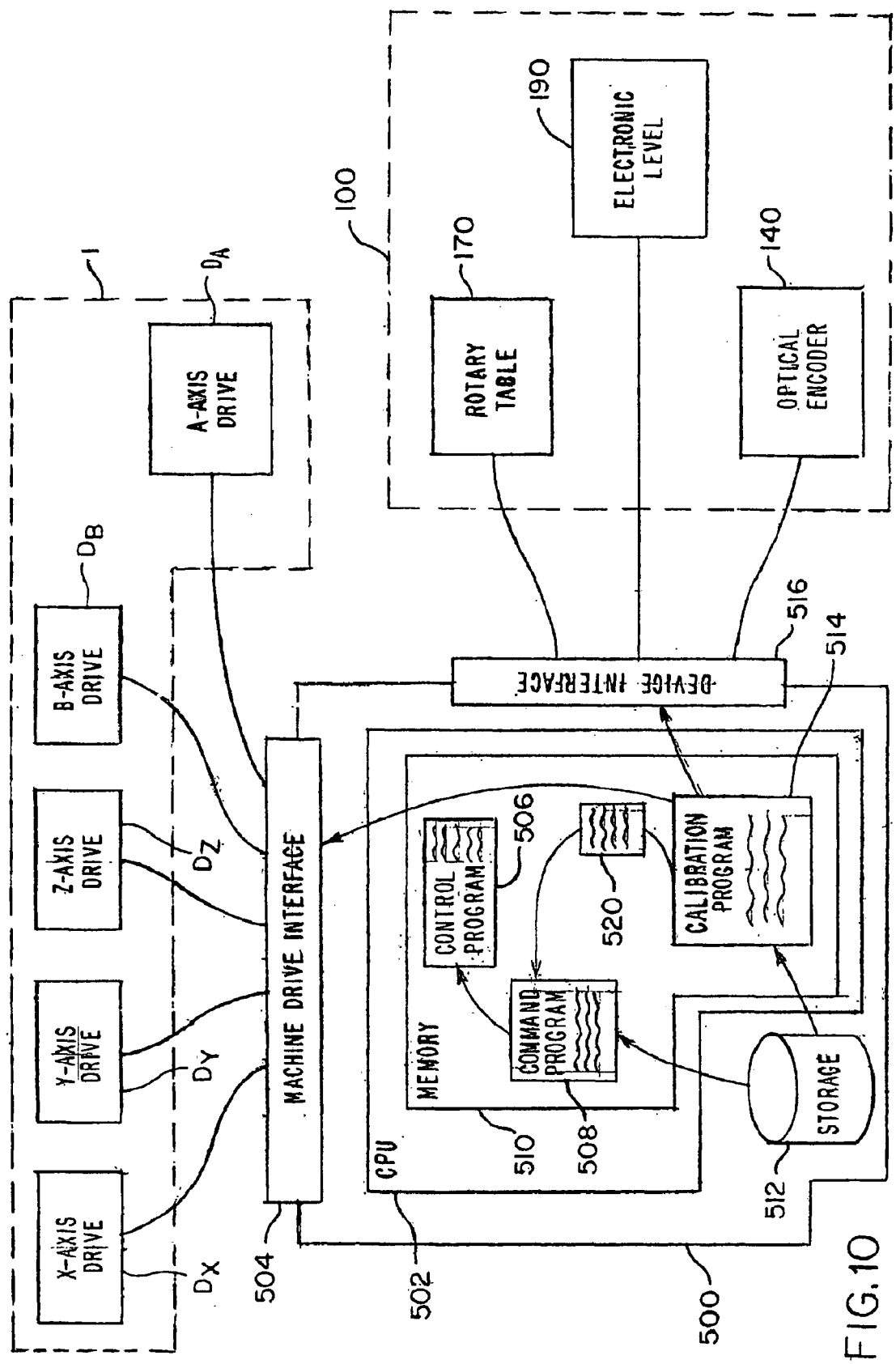
FIG. 10 is a schematic diagram of a control system for using the rotary axis calibration device of FIG. 3 according to the method of FIG. 9.

With combined reference to FIGS. 3, 9 and 10, a system and method of utilizing the device 100 for calibrating rotary motion of a machine member, for example, the pivotable swivel member 2b of the five-axis machine tool spindle 2, about the horizontally-oriented axis "A" according to the present invention will be described. It will become readily apparent to one of ordinary skill in the art, upon reading the following detailed description, that conventional NC and CNC systems and techniques may be used to implement the method hereof and that numerous variations in the particular manner in which such NC and CNC systems and techniques are implemented may be made without departing from either the spirit or the scope of the present invention.

A control system 500 is electronically coupled in any conventional manner, for example, by cables, to the machine tool 1 to directly control one or more drives $D_X$, $D_Y$, $D_Z$, $D_B$, $D_A$ which are coupled directly to the machine tool 1 to positively drive the movable components thereof. For example, X-axis drive $D_x$ may be a conventional ballscrew-type drive connected to an upright column 8 which is linearly translatable along axis "X", Y-axis drive $D_Y$ may be a conventional ballscrew-type drive connected to the spindle carrier 3 which is linearly translatable along axis "Y", Z-axis drive $D_Z$ may be a conventional ballscrew-type drive connected to the worktable 5 (FIG. 2) which is linearly translatable along axis "Z", B-axis drive $D_B$ may be a conventional rotary servo drive connected to the pallet 6 (FIG. 2) which is rotatable about axis "B" and A-axis drive $D_A$ may be a conventional rotary servo drive connected to the spindle base member 2a which is pivotable about axis "A". Alternatively, each ballscrew-type drive $D_X$, $D_Y$, $D_Z$ may be replaced with a linear servo motor. Each drive $D_X$, $D_Y$, $D_Z$, $D_B$, $D_A$ is electronically coupled to a central processing unit 502 of the control system 500 by an interface 504, which may be a common interface for all drives $D_X$, $D_Y$, $D_Z$, $D_B$, $D_A$ (as shown in FIG. 10) or may be a plurality of individual interfaces, each individual interface being provided for one of the drives $D_X$, $D_Y$, $D_Z$, $D_B$, $D_A$.

Central processing unit 502 includes an control program 506 loaded into a memory area 510 thereof which such control program 506 is adapted to receive position commands, for example, from an NC position command program 508, to directly command movement of the drives $D_X$, $D_Y$, $D_Z$, $D_B$, $D_A$ to perform complex machining operations. NC position command program 508 preferably is in the form of a set of instructions loaded into the memory area 510 from a storage device 512, such as a conventional hard disk. Although the instructions comprising the NC command program 508 are manually generated by an operator, for example, using a data-entry device such as a conventional computer keyboard (not shown), one aspect of the present invention, as will be described in greater detail below, is that the empirical data derived from the rotary calibration device 100 of the present invention modifies the NC command program 508 loaded off of the storage device 512 prior to communicating the position command instructions to the control program 506.

A calibration program 514 is loaded into the memory area 510 of the central processing unit 502, for example, from the storage device 512 and includes instructions for communicating with the rotary table 170, the electronic level 190 and the optical encoder 140, for example, through interface 516. Calibration program 514 is adapted to empirically derive a compensation table 520, as described in greater detail below, and to transmit the compensation table 520 to the command program 508 for the purpose of modifying the position command instructions in the command program 508 before the position command instructions are communicated to the control program 506. Calibration program 514 is also adapted to address the drives $D_X$, $D_Y$, $D_Z$, $D_B$, $D_A$ directly, such as, for calibration of movement of one of the drives $D_X$, $D_Y$, $D_Z$, $D_B$, $D_A$, for example, A-axis rotary drive $D_A$.

Operation of the control system 500 to use the calibration device 100 for calibrating the movement and positioning the A-axis machine tool rotary drive $D_A$ will now be described As stated above, the control program 506 includes a set of instructions received from a command program 508 for positioning the swivel member 2b, which is driven in a conventional manner by the A-axis drive $D_A$. The command program 508 preferably is a set of instructions, in the form of a look-up table having a list of preselected positions to which movement of the swivel member 2b is desired For example, the look-up table of the command program 508 may include an instruction that the swivel member 2b is to move 30° downward from a horizontal, "reference" position, the "reference" position being shown in FIG. 6. In response to the command instructions received from the command program 508, the control program 506 sends rotary movement instructions to the A-axis drive $D_A$ through the machine drive interface 504.

To calibrate the movement of the swivel member 2b to the preselected commanded position $\Delta A_{com}$, as in the exemplary embodiment being described herein, the calibration device 100 is affixed to the face 2c of the swivel member 2b as described hereinabove. The calibration program 514 then commands (this step being shown by reference numeral 600 in FIG. 9) the A-axis drive $D_A$ to move the swivel member 2b to the "reference" position, which, as stated above, orients the line segment "AC" in a horizontal orientation along the "Z" axis. As shown by reference numeral 602 in FIG. 9, the calibration program 514 obtains the reading from the electronic level 190 to determine the angle of inclination, relative to a true horizontal frame of reference, of the bracket 180, to which the level 190 is affixed. Using a first feedback loop using the reading obtained from the level 190 as input therefor, the calibration program 514 commands the rotary table 170 to move the bracket 180 towards the "on-level"orientation, such as is shown in FIG. 6. Because the accuracy of the level 190 likely exceeds the accuracy of the rotary table 170, the calibration program 514 will command the rotary table 170 to move the bracket 180 towards the "on-level" orientation until the reading from the level 190 measures an angle of inclination within a window surrounding true horizontal, for example, ±2 arc-seconds, defining a lower limit and an upper limit. Calibration program 514 then electronically "zeros" the level 190 (this step being shown in FIG. 9 by reference numeral 604). The bracket 180 is now in the reference "on-level" position, where the bracket 180 extends downwardly from the swivel member 2b and is oriented at approximately 90° thereto, and more particularly, 90° to the line segment "AC" extending lengthwise along the swivel member 2b (FIG. 3).

The calibration program then commands the A-axis drive $D_A$ to move the swivel member 2b to the preselected 30° position (this step being shown in FIG. 9 by reference numeral 606) and notes in the compensation table 520 the so-called "commanded" position $\Delta A_{com}$. Because the rotor 172 and the stator 171 of the rotary table 170 do not move relative to one another unless commanded to do so, the bracket 180 remains oriented at 90° to swivel member 2b, and more particularly, to the line segment "AC" extending lengthwise along the swivel member 2b (FIG. 7).

In response to the command 606 from the calibration program 514, the swivel member 2b rotates in the commanded direction (this step being shown in FIG. 9 by reference numeral 608); however, the swivel member 2b is likely not to rotate 30°, precisely, but rather is likely to move by some amount offset therefrom by a small, albeit measurable, angular distance $\Delta A_{off}$.

Using a second feedback loop 610, the calibration program 514 commands the rotary table 170 to move the bracket 180 in a direction opposite to the direction of movement of the swivel member 2b until the electronic level 190 measures an angle of inclination of the bracket 180 to be within a preselected window around the "on-level" orientation, for example, ±2 arc-seconds. As the rotary table 170 moves the swivel member 2b towards the "on-level" position, the calibration program 514 obtains readings from the optical encoder 140 to measure the angular distance the bracket 180 has moved, relative to the position the bracket 180 occupied prior to movement thereof by the rotary table 170. Once the bracket 180 has moved such that the level 190 measures that the orientation thereof is within the preselected window around the "on-level" orientation, the calibration program 514 obtains the value $\Delta C_{enc}$ measured by the encoder 140 (this step being shown in FIG. 9 by reference numeral 612) which represents the angular displacement of the bracket 180, relative to the swivel member 2b. Because the level 190 is within the window surrounding the "on-level" orientation, the bracket 180 is substantially vertically-aligned (FIG. 8).

Alternatively, the second feedback loop 610 may be eliminated, in which case, the rotary table 170 is commanded to move the commanded rotation $\Delta A_{com}$, in a direction opposite thereto, and a reading is taken from the level 190 after the rotary table 170 has moved. If the reading obtained from the level 190 is within the preselected window, no further motion is required and calibration program continues. However, if the reading is not within the preselected window, the rotary table 170 will be commanded to move an additional amount, after which, another reading is obtained from the level 190. This two-step process is repeated until the level 190 obtains a reading within the preselected window.

The calibration program 514 next obtains the final reference reading of the level 190, as the level 190 rests in the substantially vertically-aligned orientation This reading $\Delta C_{ref}$ (this step being shown by reference numeral 614 in FIG. 9) represents the difference between the starting and ending angular orientations of the level 190 between the reference, "on-level" orientation shown in FIG. 6 and the final substantially-level orientation shown in FIG. 8 and the value of $\Delta C_{ref}$ will be within the window, as described above. As shown in FIG. 9 by reference numeral 616, the calibration program 514 adds the angular displacement $\Delta C_{enc}$ value obtained by the encoder 140 to the reference reading $\Delta C_{ref}$ obtained from the level 190; this sum representing the actual angular displacement $\Delta C_{act}$ of the bracket 180, by the swivel member 2b, from the "on-level" orientation.

Because bracket 180 rotates about an axis, namely, axis "C", which is parallel to the axis, namely, axis "A", about which the swivel member 2b rotates, and because the distance therebetween (this step being shown as reference line segment labeled "AC") is fixed, the actual angular displacement $\Delta C_{act}$ of the bracket 180 is also the actual angular displacement $\Delta A_{act}$ of the swivel arm 2b. Subtracting (this step being shown in FIG. 9 by reference numeral 618) the value of the actual angular displacement $\Delta A_{act}$ from the value of the commanded position $\Delta A_{com}$, then, returns the offset $\Delta A_{off}$, that being, the angular distance short (if positive) or long (if negative) from the commanded position the swivel arm 2b actually traveled.

The control program 506 commands (this step being shown in FIG. 9 by reference numeral 620) the A-axis drive $D_A$ to move an additional incremental amount equal to the offset value $\Delta A_{off}$, after which, the swivel member 2b will be accurately positioned at the commanded position. Of course, the calibration program 514 may be programmed to obtain offset values for a number of commanded positions, for example, in 1° increments, and to compile the data acquired thereby in the compensation table 520. Accurate measurement and calibration of the rotary motion of the swivel member 2b, then, may be obtained throughout a range of motion of the swivel member 2b.

To integrate the calibration routine described above into the command program 506, the calibration program 514 transmits and stores this offset value $\Delta A_{off}$ in the compensation table 520 in a data cell therein corresponding to the commanded position entry therein. The compensation table 520, then, operates functionally as a look-up table which is accessed by, or alternatively, imported into, the command program 508 such that, when the control program 506 reads a given angular position command from the command program 508, the offset is automatically added to the value of the commanded position. In this sense, the calibration program 514, and the calibration routine described above, generates an empirically-derived NC program.

As a result of this, an operator may create a command program 508 using conventional programming languages and techniques to enter the precise values of the commanded positions. The device and method of the present invention may be utilized to modify the command program 508 to correct any positioning errors measured during the calibration procedure. For example, an operator, desiring for the swivel member 2b to move 30° downward from the spindle reference position, which is shown in FIG. 6, may observe that, without performing the calibration procedure hereof, the swivel member 2b actually rotates only 28.5° downward from the reference position. If the calibration procedure hereof is performed, using the desired 30° rotary movement, an offset value of −1.5° will be derived and integrated into the command program automatedly. The operator, then, need not independently determine the value of the offset value and manually adjust the preferred angular motion of the swivel member 2b by manually modifying the control program 508; rather, the calibration program 514 performs this modification for the operator.

Although the control 500 has been described as forming apart of the machine tool control system, central processing unit 502 and storage 512 may instead be provided on a separate computing unit, such as a laptop personal computer (not shown), which is cabled to the machine tool for transfer of data therebetween. In such an arrangement, compensation table 520 may be prepared "off-line" (i.e., not as a process integral with the machine tool control system) and uploaded into the machine tool control system for use thereby.

Figure 11:
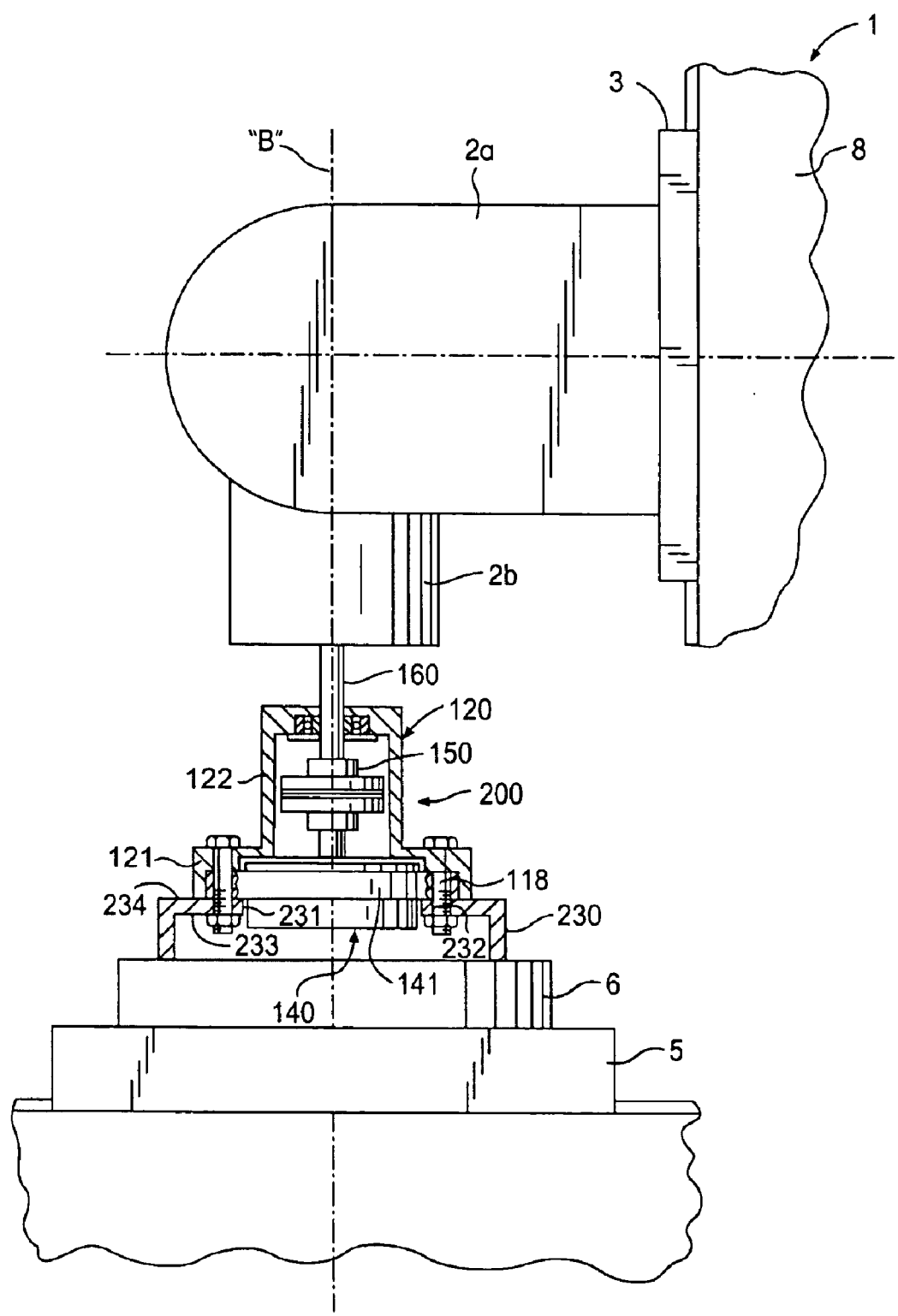
FIG. 11 is a partial section view of the rotary axis calibration device of FIG. 3, shown affixed to a pallet of the machine tool of FIG. 2 for use of the device according to an alternative embodiment hereof, and, FIG. 12 is a partial section view of a rotary axis calibration device according to a preferred embodiment of the present invention.

Referring now to FIG. 11, the rotary calibration device according to the present invention is adaptable to calibrate rotary motion of a machine member which rotates about a horizontally-oriented axis of rotation, a vertically-oriented axis or rotation or any obliquely-oriented axis of rotation. For the sake of illustration, a rotary calibration device 200 according to one alternative embodiment of the present invention will be described with reference to measuring and calibrating rotary motion of a machine member which rotates about a vertically-oriented axis of rotation, such as, for example, the "B" axis about which the pallet 6 rotates. The rotary calibration device 200 according to the present embodiment includes many components in common with the device 100 described above, and like reference numerals represent like components. However, it will readily be apparent to one of ordinary skill in the art, upon reading the following detailed description, that the device 200 according to the present embodiment can be used to measure and calibrate rotary motion of a machine member which rotates about an obliquely-oriented axis of rotation, with little or no modification thereto.

The device 200 is adapted to measure and calibrate rotary motion of the pallet 6 about the "B" axis by removing the rotary table 170 (FIG. 3), the bracket 180 (FIG. 3), to which the level 190 (FIG. 3) is mounted, and the clamp 181 from the shaft 160. The first end 161 of the shaft 160, then, extends from the second sleeve portion 122 of the housing 120, through the bearing 130 (FIG. 3).

The device 200 is affixed to the pallet 6 in any suitable manner which securely aligns the central axis "C" (FIG. 5) of the device 200 parallel to the axis about which rotary motion is desired to be calibrated, that axis being, in the exemplary embodiment, vertical axis "B". For example, a mounting block 230 may be secured to the pallet 6 in any conventional fashion and may include a central opening 231 sized to receive a portion of the encoder 140 therein. One or more holes 232 may be provided through an upper wall 233 of the block 230, spaced equidistantly therearound, to align with the holes 127 of the housing 120, and with the holes 147 of the encoder 140, when the device 200 is positioned over an opening 231 provided in the upper wall 233 of the block 230. Holes 232 are preferably throughbores, each of which is sized to receive one bolt 118 therethrough. The encoder 140, then, is securely, albeit removably, affixed to the block 230 by aligning encoder holes 147 between block holes 232 and housing holes 127 and engaging the bolts 118, for example, with threads provided in block holes 232, or as stated above, alternatively, with nuts provided internal to the block 230. The encoder flange 141 is sandwiched between the first step 124a of the central passageway of the first sleeve portion 121 of the housing 120 and the upper wall 234 of the block 230. Bolts 118 also rigidly mount the housing 120 to the pallet 6, and therefore, fixedly couple the housing 120, the encoder 140 and the block 230 or unitary rotation thereof with the pallet 6 about axis "B".

Figure 1:
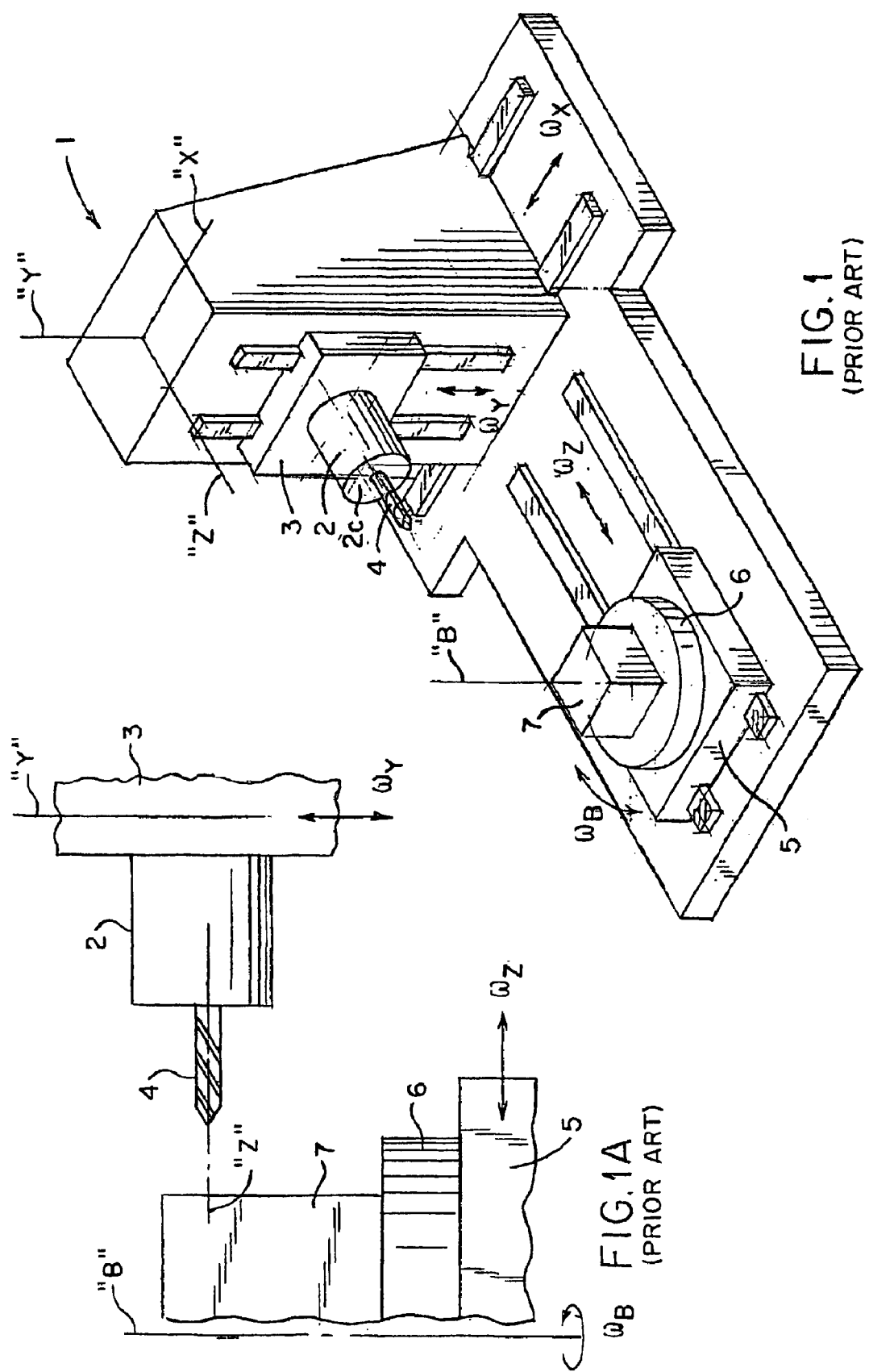
FIG. 1 is a schematic perspective view of a four axis machine tool of the prior art, showing a spindle mounted for motion relative to a workpiece.
Figure 2:
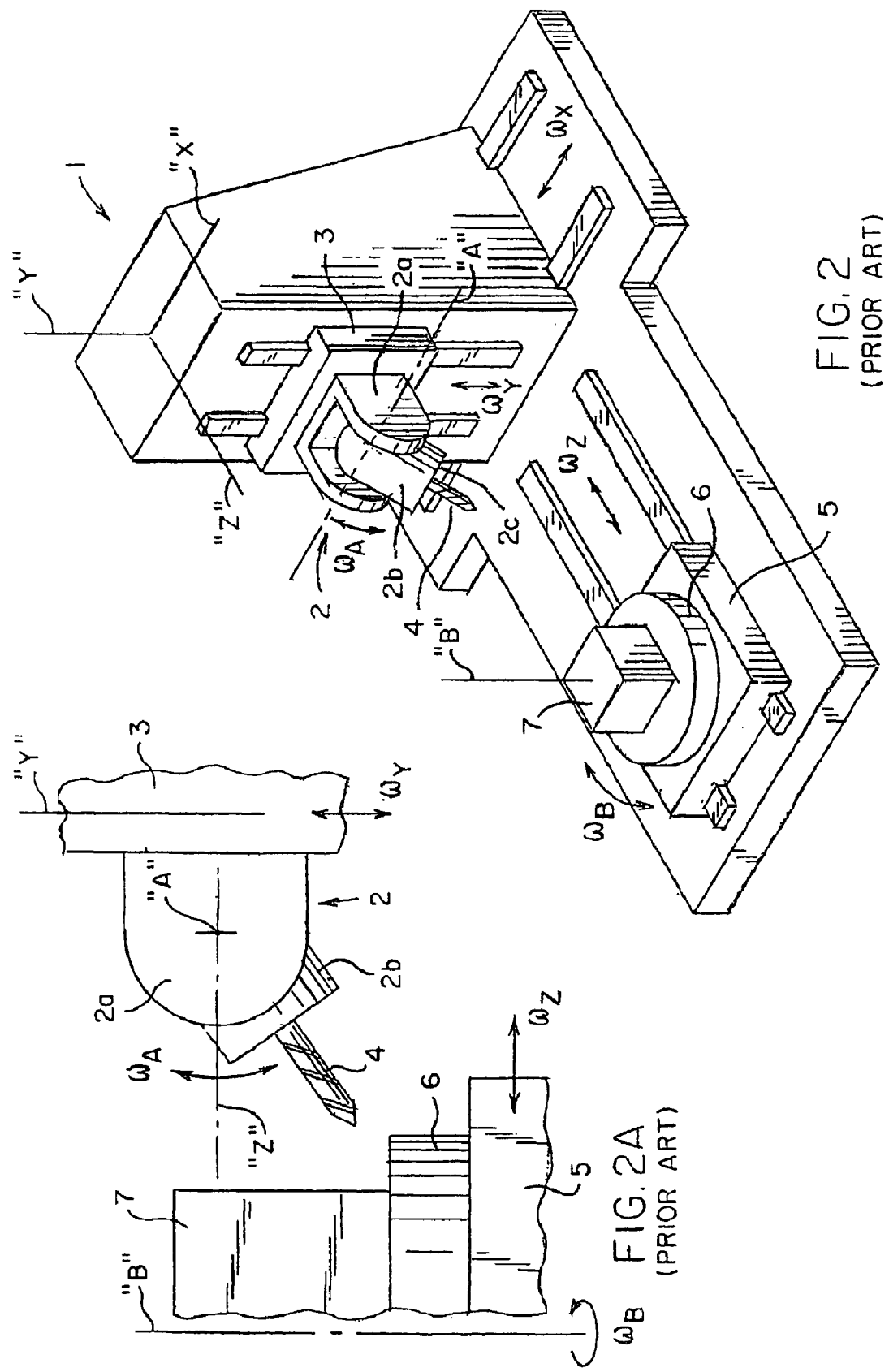
FIG. 2 is a schematic perspective view of a five axis machine tool of the prior art, showing a spindle mounted for motion relative to a workpiece.

The shaft 160 is sized to be gripped by a chucking apparatus (not shown) provided in the swivel member 2b of the spindle 2, which typically is used, for example, to grip the tool 4 (FIG. 2). Owing to the degrees of motion of the machine tool 1, the swivel member 2b is positionable, relative to the worktable 5 such that the swivel member 2b may securely, albeit removably, grip the shaft 160 while being coaxially aligned therewith. That is, the longitudinal axis of the swivel member 2b may be oriented to lie along axis "B".

Rotation of the housing 121, such as, by rotation of the pallet 6, about axis "B", then, rotates the encoder 140 mounted thereto. However, the input shaft 142 of the encoder 140, which is coupled to the shaft 160 by the disc coupling 150, is held firmly by the chucking apparatus of the swivel member 2b of the spindle 2. Rotational motion of the shaft 160, relative to the pallet 6, then, may be measured by the encoder 140. A second shaft (not shown) may be coupled to the shaft 160 by a second disc coupling (not shown) to accommodate axial misalignment of the swivel member 2b and the encoder 140.

Operation of the device 200 to calibrate rotary motion of the pallet 6 about the axis "B" is performed using many of the steps used to calibrate rotary motion of the swivel member 2b about the axis "A", as described hereinabove in regard to device 100. However, because the rotary table 170 (FIG. 3), the bracket 180 (FIG. 3), the level 190 (FIG. 3) and the clamp 181 are removed from the device 200 for the purpose of calibrating rotary motion about a non-horizontally-oriented axis, such as axis "B", use of the device 200 according to the present embodiment involves less operations.

Once the device 200 has been mounted to the pallet 6, such as, by block 230, to lie along the axis "B", the worktable 5 and the spindle 2 are positioned such that the longitudinal axis of the swivel member 2b lies along the axis "B". Although, in the present embodiment hereof, the device 200 is mounted to the block 230, which is mounted to the pallet 6, the device 200 may alternatively be mounted directly to the pallet 6. The swivel member 2b is thereafter caused to move towards the device 200 such that the shaft 160 extending from within the housing 120 of the device 200 may be gripped securely by the chucking apparatus (not shown) of the spindle 2. The encoder 140 is thereafter electronically "zeroed", or alternatively, the angular position of the encoder 140 is recorded.

Next, the pallet 6 is commanded to rotate to some preselected angular position, for example, 30° in the clockwise direction. As the pallet 6 rotates, the swivel member 2b of the spindle 2 holds the input shaft 142 of the encoder 140 in the "zeroed", or reference, position, and the actual rotary movement of the pallet 6 is thereby accurately measured by the encoder 140. The actual rotary motion of the pallet 6, then, is compared to the commanded rotary motion thereof giving rise to an empirically-derived positioning error, that being, the difference therebetween. This positioning error is then transmitted to the machine control as set forth in greater detail hereinabove, to correct the position of the pallet 6.

Using the device 200 as just described with reference to calibrating the rotary motion of a machine member, such as the pallet 6, about a non-horizontally-oriented axis, such as axis "B", it will be apparent to those of ordinary skill in the art, upon reading the within detailed description, that the device 200 may be used in like manner to calibrate the rotary motion of a machine member about any axis along which the swivel member 2b of the spindle 2 may be oriented. Moreover, an external mounting fixture (not shown) may be used in place of the swivel member 2b of the spindle 2 to securely grip the shaft 160 of the device 200 in any orientation thereof, for example, neither "horizontal" nor "vertical" but oblique.

Alternatively, the device 200 mounted in the manner shown in FIG. 11 may also be used to calibrate the rotary motion of the swivel member 2b of the spindle 2, for example, where the swivel member housing, itself, is adapted to rotate, for example, about the "B" axis. The worktable 5, then, would securely hold the housing 120 (and the encoder 140 mounted therein), whereas rotation of the swivel member 2b would rotate the shaft 160 (and the encoder input shaft 142) for measurement of the rotary motion thereof. Alternatively still, the housing 120 may be mounted to the face 2c (FIG. 3) of the swivel member 2b, in which case, a mounting fixture (not shown) must be mounted to the pallet 6 for the purpose of gripping the shaft 160.

Figure 12:
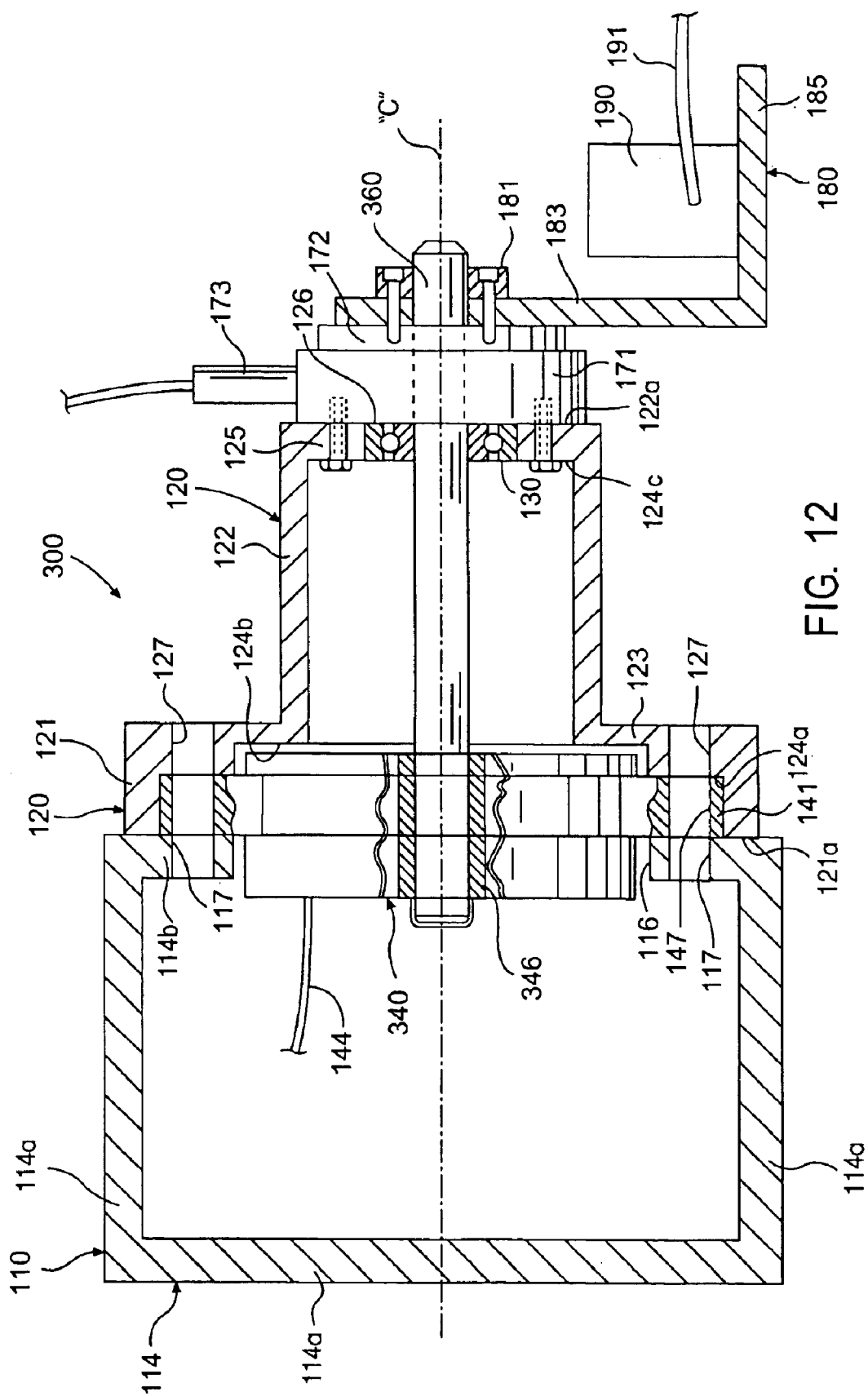

Referring now to FIG. 12, a rotary calibration device 300 according to a preferred embodiment of the present invention includes many components in common with the devices 100, 200 described hereinabove in regard to alternative embodiments hereof and like reference numerals represent like components. The device 300 according to the preferred embodiment of the present invention, however, is identical to the device 100 first described hereinabove except that, in the preferred embodiment, coupling 150 (FIG. 5) is not included, and shaft 142 is not included with encoder 140.

For example, an encoder 340 for use with the preferred embodiment hereof, such as a model RON 800 or model RON 900 encoder sold by Heidenhain Corporation of Schaumberg, Ill., includes an input sleeve 346 sized to receive shaft 360, which extends continuously through housing 120. Input sleeve 346 includes a suitable locking mechanism (not shown) to fixedly rotatably secure the shaft 360 thereto for rotational measurement of the shaft 360, as described hereinabove. In affixing the shaft 360 to the input sleeve 346 of the encoder 340, the shaft 360 may extend entirely through the encoder 340 or may extend only partways therethrough and suitable means by which the shaft 360 is rotatably secured to the input sleeve 346 will be apparent to those of reasonable skill in the art. Connecting the shaft 360 (the rotation of which is controlled by the rotary table 170) directly to the input sleeve 346 of the encoder 340 reduces the amount of radial and rotational "slack" that may exist between the rotary table 170 and the encoder 340, thereby providing a more accurate rotary measurement. Moreover, elimination of the coupling 150 allows for the housing 120 to possess a more compact construction.

The method according to the present invention may be adapted to provide dynamic sampling and feedback during the calibration procedure. Referring back to FIG. 9, the method described hereinabove includes, generally, the steps of zeroing the level, moving the swivel member to the commanded position, moving the rotary table in an opposite direction until the level measures an orientation thereof within the aforementioned window around the zeroed position and performing one or more calculations based upon the orientation of the level to obtain an offset value, which is then stored in a comp table for use by the machine during operation.

One alternative method according to the present invention provides the steps of zeroing the level, rotating the swivel member at some predetermined rate of rotation through a predetermined arcuate sweep and rotating the rotary table at the same predetermined rate of rotation in a direction opposite to the direction of rotation of the swivel member. At some predetermined increment in time, for example, every one second, the commanded position of the swivel member is calculated (rate of rotation multiplied by time) and compared to a reading obtained from the level, the difference therebetween corresponding to the offset value discussed above. The offset value is stored alongside the commanded position in a look-up table for later use during machining operations.

The present invention also includes a method whereby the rotary device itself is calibrated to eliminate inherent inaccuracy thereof. That is, the device, being a mechanical structure, may possess some degree of inaccuracy, even though the magnitude of any such inaccuracy is likely to be very small. However, when the device is installed on a machine for the purpose of determining the accuracy of a rotary axis of the machine, the offset values calculated by the machine calibration methods described above may reflect a combination of the inaccuracy of the machine and the inaccuracy of the device. To isolate the inaccuracy of the device from the inaccuracy of the machine, the device may be calibrated beforehand to generate a device comp table, the values of which should be added to the measurements obtained by the device during a machine calibration procedure. One method of calibrating the device is to mount the device to a rotary member in a controlled environment such as in a metrology lab. Laser measurement equipment is installed to very accurately measure the rotary movement of the rotary member, and these measurements are then compared to the measurements obtained by the device in performing the method hereof the difference therebetween being a measurement of the inaccuracy of the device itself. In this manner, a device comp table can be prepared and stored in the program and consulted when the device is measuring the accuracy of a rotary member of a machine.

While the invention has been illustrated by referring to a number of preferred embodiments, and such preferred embodiments have been described in considerable detail with reference to the drawings, it is not the intention of applicants that the invention should be restricted to such detail. Rather, it is the intention of the applicants that the invention be defined by the scope of the appended claims and all equivalents of the preferred embodiments falling within the scope thereof.

We claim:

1. A method for calibrating movement of a machine member about a rotary axis, comprising the steps of: (a) mounting a calibration device to said member for rotation relative thereto; (b) detecting a reference orientation of said calibration device when said member is in a first position, said calibration device forming a first position angle relative to said member when said member is in said first position and said calibration device is in said reference orientation; (c) selecting a commanded position of said member; (d) detecting a difference between said commanded position and said first position to obtain a commanded angle; (e) moving said member towards said commanded position until said member reaches a second position; (f) moving said calibration device until said calibration device is near said reference orientation, said calibration device forming a second position angle relative to said member when said member is in said second position and said calibration device is near said reference orientation; (g) detecting a difference between said first and second position angles to obtain a displacement angle; and, (h) comparing said commanded angle to said displacement angle to obtain an offset angle; characterized in that movement of said calibration device is a function of said orientation thereof.

2. The method of claim 1, wherein said step (e) includes the step of moving said member towards said commanded position in a first direction.

3. The method of claim 2, wherein said step (f) includes the step of moving said calibration device in a second direction opposite said first direction.

4. The method of claim 1, wherein said steps (e) and (f) are performed simultaneously.

5. The method of claim 1, further comprising the steps of: (i) associating said offset value with said commanded position; (j) recording said offset value with said commanded position; and, (k) repeating said steps (c)-(h) for an additional commanded position.

6. The method of claim 5, wherein each offset value and commanded position is stored together in a look-up table.

7. The method of claim 5, further comprising the step of returning said member to said first position prior to repeating said steps (c)-(h).

8. The method of claim 1, where said step (b) includes the step of selecting a level to detect said reference orientation.

9. The method of claim 1, wherein said step (g) includes the step of selecting an encoder to detect said reference angle.

10. The method of claim 1, wherein said step (f) includes the step of providing a rotary drive to controllably move said calibration device.

11. The method of claim 1, wherein said step (f) includes the steps of selecting a lower limit not greater than said reference orientation, selecting an upper limit not less than said reference orientation, and wherein said calibration device is moved until said reference orientation is greater than said lower limit and less than said upper limit.

12. The method of claim 1, wherein said calibration device rotates about a device axis parallel to said member rotary axis.

13. The method of claim 1, wherein said calibration device rotates about a device axis coincident with said member rotary axis.

14. The method of claim 1, wherein said calibration device moves when said calibration device is in an orientation other than said reference orientation.

15. A device for measuring and calibrating the rotary motion of a rotatable machine member such as a pivotable swivel member mounted to pivot about a first axis, the device comprising:

an arm mounted to the pivotable swivel member;

an encoder mounted internal to the arm and positioned therein to measure rotation about a second axis that is parallel to the first axis;

a structure mounted to the arm;

a rotary table mounted to the structure opposite the arm, the rotary table comprising a stator fixedly mounted to the structure and a rotor coupled to an input shaft of the encoder such that rotary movement of the rotor can be measured by the encoder; and, an electronic level fixedly secured to the rotor;

whereby the encoder, the rotary table and the electronic level are each electronically coupled to a control system which is adapted to obtain readings from the encoder and from the electronic level and to command controlled rotation of the rotor relative to the stator.

16. The device of claim 15 further comprising an optical encoder comprising the encoder.

17. The device of claim 15 further comprising:

a rotary drive comprising the rotary table, whereby the orientation of the electronic level secured to the rotor may be altered by the rotary drive.

18. A device for measuring and calibrating the rotary motion of a rotatable machine member such as a pivotable swivel member mounted to pivot about a first axis, the device comprising:

an arm mounted to the pivotable swivel member;

an optical encoder mounted internal to the arm and positioned therein to measure rotation about a second axis that is parallel to the first axis;

a housing mounted to the arm;

a rotary table comprising a rotary servo drive mounted to the housing opposite the arm, the rotary table comprising a stator fixedly mounted to the housing and a rotor coupled to an input shaft of the encoder such that rotary movement of the rotor can be measured by the encoder; and, an electronic level fixedly secured to the rotor, whereby the orientation of rotor may be sensed by the electronic level and the orientation of the electronic level may be altered by the rotary drive, and whereby the encoder, the rotary table and the electronic level are each electronically coupled to a control system which is adapted to obtain readings from the encoder and from the electronic level and to command controlled rotation of the rotor relative to the stator.

* * * * *